April 4, 1950
G. H. WANNIER
2,502,683
METHOD AND APPARATUS OF MEASURING THE
ACTIVITY OF RADIOACTIVE MATERIALS
Filed Sept. 22, 1948
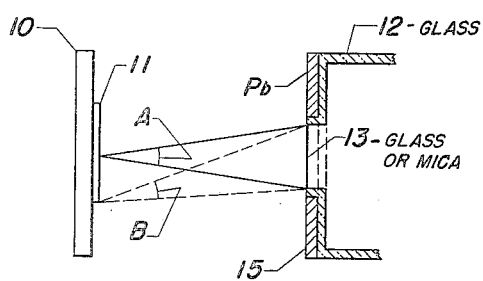
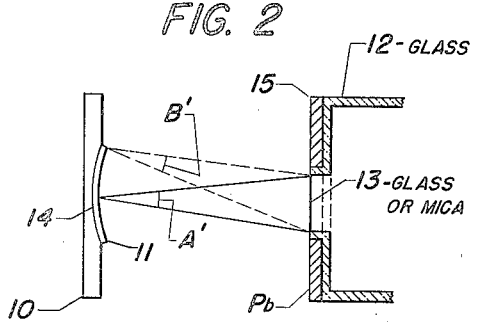
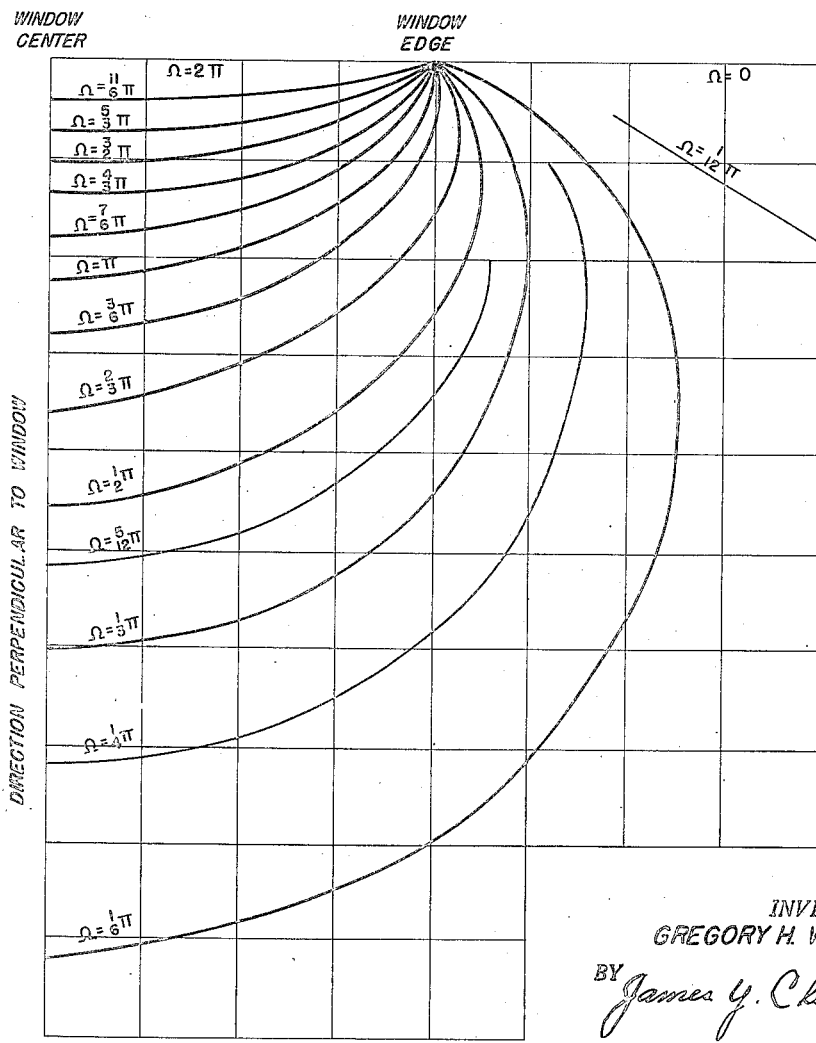
INVENTOR.
GREGORY H. WANNIER
BY James Y. Cleveland
ATTORNEY Patented Apr. 4, 1950

2,502,683

UNITED STATES PATENT OFFICE 2,502,683

METHOD AND APPARATUS OF MEASURING THE ACTIVITY OF RADIOACTIVE MATERIALS

Gregory H. Wannier, Pitman, N. J., assignor to Socony-Vacuum Oil Company, Incorporated, a corporation of New York Application September 22, 1948, Serial No. 50,594

3 Claims. (Cl. 250—83.6)

This invention relates generally to the analysis of radioactive substances and more particularly to apparatus for measuring the activity of a sample of the substance.

When the activity of a radioactive sample is determined by employing a counter tube, the number of counts which are observed per second depends upon several outside factors. An accurate control of these factors is essential if the activity determination is to be accurate. The most important of these factors is the "counting geometry."

This invention solves the problem of providing a well-defined counting geometry. When a radioactive point source is placed in front of a counter, the counter response is proportional to the solid angle subtended by the counter window at the source. This geometrical factor can be calculated for point sources, but difficulties are encountered if the source is extended over a substantial area.

According to the prior art it is common practice to deposit radioactive material on an inactive backing which is usually a plane in the form of a disk. If such a plane disk is placed in front of a counter, the solid angle subtended at the source by the counter window varies from point to point over the surface of the sample. It is possible, in principle, to calculate the mean solid angle, but such calculation presumes that the radioactive material is distributed uniformly over the surface. Such a condition is difficult to realize in practice. It follows that this geometrical factor can vary from sample to sample, even though the samples are of the same size and placed in the same position on the disk. In practical cases this geometrical error is the main error of the entire measurement.

This invention eliminates this geometrical error by making the surface which supports the radioactive material curved, rather than a plane. The curvature is made such that the solid angle subtended by the counter window at the source is the same for every point on the surface of the sample of radioactive material. The mean solid angle is then automatically also the same, and the result so obtained is independent of whether the radioactive material is distributed evenly over the surface or not.

Therefore the primary object of this invention is to provide a method and apparatus for eliminating from an activity measurement of a radioactive sample of material, the geometrical error. More specifically the present invention has for an object to so arrange the sample undergoing test with respect to the window of the counter that the solid angle at the source subtended by the window is the same for every point on the surface of the source. Another specific object of this invention is the provision of a curved surface, on which the sample can be deposited, whose curvature and whose distance from the window of the counter are so selected that the solid angle, on the surface of the sample, subtended by the window is the same for all points on the surface of the sample. Other objects and advantages of the present invention will become apparent from the following detailed description when considered with the drawings, in which Figure 1 is a schematic illustration of the arrangement of a sample and counter that is in accordance with the prior art;

Figure 2 is a schematic illustration of a sample and counter arranged in accordance with the present invention; and Figure 3 is a group of curves which illustrate the manner in which the solid angle subtended by the counter window varies from point to point over the surface of a sample having the conventional arrangement.

Referring to the drawings in detail, particularly Figure 1, there is shown a backing element 10 which is formed of an inactive metal. Element 10, an edge of which is shown, is a plane and may take the form of a disk. Element 10 has deposited on one face thereof a sample 11 of radioactive material, the activity of which it is desired to measure. Adjacent the sample 11 there is disposed a counter tube 12, a fragment of which is shown in section. The fragment shown may have a glass wall with a window 13 formed therein. Window 13 may be sealed by any material that is transparent to the radiation emitted by the sample 11. Suitable window materials are glass, mica, etc. Window 13 is usually circular in form.

A comparison of the angles A and B will show the manner in which the solid angle at the surface of the sample subtended by the window 13 varies from point to point on the surface of the sample 11. It is obvious the window 13 will subtend the greatest angle, angle A, at the center of the surface of the sample 11 and that the angle subtended by the window 13 at the edge of the sample, angle B, will be the smallest. The manner in which the solid angle varies from point to point over the surface of the sample 11 may be read off the curves of Figure 3. Therefore it is clear that a significant geometrical error will be introduced by the use of this arrangement, Now refer to Figure 2 which illustrates the manner in which the sample is arranged when the present invention is employed. Element 10 may still be a disk formed of an inactive metal but one face thereof has a concave recess 14 formed therein. This curved portion is preferably in the form of a spherical cap and has deposited over its surface the sample 11 whose activity it is desired to measure. The location of the counter tube 12 and window 13 with respect to the center of the surface of the sample 11 is the same as in Figure 1. However, in the arrangement of Figure 2, the angles subtended at all points on the surface of the sample are equal. This can be seen when angles A' and B' are compared. The distance between the center of the sample and the center of the counter window and the curvature of the sample are so selected that the angles from any points on the sample that are subtended by the window are always the same size.

An example will serve to illustrate the difference between the old arrangement and the new. According to the prior art arrangement, if a counter having a circular window of 1.5 cm. diameter is used and a plane circular source of 1 cm. diameter is placed directly opposite the window at a distance of 0.75 cm., then the solid angle subtended by the window varies by approximately 25% from the center to the edge of the source, as may be seen from the curves of Figure 3. If, on the contrary, the source be given the shape of a spherical cap, as shown in Figure 2, whose radius of curvature is 1 cm., then this variation is reduced to a negligible amount. This specific example is only a special case of the general principle stated above. Other examples can be made up readily by consulting the curves of Figure 3.

In practicing the present invention care must be exercised to prevent radiation from entering the counter tube except through the window 13.

To this end a lead shield 15 is placed between all parts of the tube and the sample except between the window and the sample.

It is obvious that the element 10 need not be formed of metal, for example, blotting paper, pressed fibre, or other materials may be used so long as they are not radioactive.

I claim:

1. An apparatus for measuring the activity of a sample of radioactive material that comprises a counter tube, means defining a window in the counter tube, means transparent to radiation emitted by the sample for sealing said window, a sample holder disposed adjacent said window, said sample holder having a concave recess in the side thereof adjacent to and in axial alignment with said window, a coating of the radioactive material on the surface defining the concave recess, the curvature of the recess bearing a relation to the axial distance between the sample and the window such that the solid angle subtended by the window at any point on the concave surface of the sample is a constant.

2. An apparatus for measuring the activity of a sample of radioactive material that comprises a counter tube, means defining a window in the counter tube, means transparent to radiation emitted by the sample for sealing said window, means disposed about the window for shielding the remainder of the tube from radiation, a sample holder disposed adjacent said window, said sample holder having a concave recess in the side thereof adjacent to and in axial alignment with said window, a coating of the radioactive material on the surface defining the concave recess, the curvature of the recess bearing a relation to the axial distance between the sample and the window such that the solid angle subtended by the window at any point on the concave surface of the sample is a constant.

3. An apparatus for measuring the activity of a sample of radioactive material that comprises a counter tube, means defining a window in the counter tube, means transparent to radiation emitted by the sample for sealing said window, a sample holder disposed adjacent said window, said sample holder having a concave recess in the side of the holder adjacent to and in axial alignment with said window, a coating of the radioactive material on the surface defining the concave recess, the curvature of the recess bearing a relation to the axial distance between the sample and the window and to the area of the window such that the solid angle subtended by the window at any point on the concave surface of the sample is a constant.

GREGORY H. WANNIER.

REFERENCES CITED

The following references are of record in the file of this patent:

UNITED STATES PATENTS

| Number | Name | Date |
| --- | --- | --- |
| 1,733,159 | Leach | Oct. 29, 1929 |